March 31, 1936.    L. M. C. SEAMARK    2,035,925
CASING HEAD EQUIPMENT
Filed July 7, 1933    2 Sheets-Sheet 1

Inventor
L. M. C. Seamark
by
Attorney.

March 31, 1936. L. M. C. SEAMARK 2,035,925
CASING HEAD EQUIPMENT
Filed July 7, 1933 2 Sheets-Sheet 2

Inventor
L. M. C. Seamark
by
Attorney.

Patented Mar. 31, 1936

2,035,925

UNITED STATES PATENT OFFICE 2,035,925

CASING HEAD EQUIPMENT

Lewis Mervyn Cecil Seamark, Radfords, Dawlish, England

Application July 7, 1933, Serial No. 679,393
In Great Britain May 24, 1933

16 Claims. (Cl. 286—16)

This invention relates to casing head equipment for bore holes or wells, and especially to casing head equipment provided according to the specifications filed pursuant to the co-pending application, Serial No. 483,290 dated 20th September 1930, now Patent No. 1,942,366, dated January 2, 1934, and according to the Patent No. 1,902,906 dated 28th March 1933.

The present invention has among its objects to prevent excessive deformation of the massive elastic sleeve under pressure externally applied to the sleeve, and derived for example from the well, and to facilitate the movement of the drill pipe sections and couplings or the like into and through the massive elastic sleeve.

The invention has also among its objects to simplify the construction of the stationary type of a blow-out preventer or packer involving the use of a massive elastic sleeve, whereby the parts may be readily inserted and secured in position within the stationary casing and readily withdrawn, and to provide a housing for the sleeve whereby effective pressure tight joints are provided under conditions in which the insertion and withdrawal of the housing is freely permitted.

According to the invention the massive elastic sleeve has provided or moulded within it, advantageously at its upper part only, a circular series of radial plates or segments of metal or other suitable material set equidistant apart to extend to the inner peripheral face of the sleeve and so incorporated in the sleeve that the radial plates or segments are not adapted in use to be separated from the sleeve except under its elastic resistance, so that thus under pressure externally applied to the sleeve, the radial plates or segments approach each other near their inner ends and cause the compression of the elastic substance of the sleeve at positions between the radial plates or segments near their inner ends, whereby an increasing resistance is thus imposed to the internal contraction of the sleeve.

According to the invention, moreover, the inner faces or inner edges of the radial plates or segments, immediately beneath the upper end ring in which the upper end of the sleeve is secured, normally stand proud of the internal peripheral surface of the sleeve at its mouth, so as to present faces or edges of a material of a hard or tough character which by contact with the drill pipe sections and couplings or the like as they enter the sleeve distribute around these parts the pressure applied externally upon the sleeve. In this way resistance is imposed to the excessive deformation of the sleeve at its upper end, and thus excessive friction between the sleeve and the parts of the drill stem and couplings or the like on passing into the upper end of the sleeve is avoided, and thus also the passage of these parts through the sleeve is facilitated.

According to the invention, moreover, the respective radial plates or segments are provided of such determined form in radial and transverse section and otherwise as hereinafter described that the imposition of a relatively considerable resistance to internal contraction of the sleeve is facilitated, to resist the tendency to deformation at the upper end of the sleeve under high pressures such as imposed externally to the sleeve or derived from the well.

According to the invention, moreover, in its application to a stationary type of blow-out preventer or packer, a housing for the elastic sleeve may be provided comprising two end rings within which the respective upper and lower ends of the sleeve are secured, and between which an external perforated cylinder may be provided, means being also provided such as described in the specifications of the prior application and patent aforesaid by which the ends of the massive elastic sleeve are secured in the end rings and by which thus the perforated cylinder may be held in position between them; means being also provided by which fluid tight joints may be maintained between the end rings or the upper and lower ends of the perforated cylinder and the stationary casing as hereinafter described; while the housing may be secured in position by a locking ring provided with outwardly extending segments adapted to engage within bayonet slots in the upper end of the stationary casing. Means may be provided for retaining the housing in position within the stationary casing and for imposing a pressure to ensure tight joints of the end rings with the adjacent contact faces of the housing; for these purposes a number of set screws may be mounted in determined positions on the locking ring to engage the top of the upper end ring for the application of pressure thereon, whereby fluid tight joints may be made between the respective end rings and the stationary casing. Or alternatively the use of a separate locking ring may be avoided by the provision of the upper end ring as a locking ring.

The invention also comprises the features hereinafter described.

The invention is illustrated by way of example in the accompanying drawings, in which Figure 1 is an elevation in half section of a blow-out preventer or packer and a massive elastic sleeve therefor constructed or provided according to the invention.

In the drawings the same reference letters apply to the same parts as in the drawings of the prior patent aforesaid, while the features involved in the carrying out of the present invention are indicated by numerals.

Figure 1:
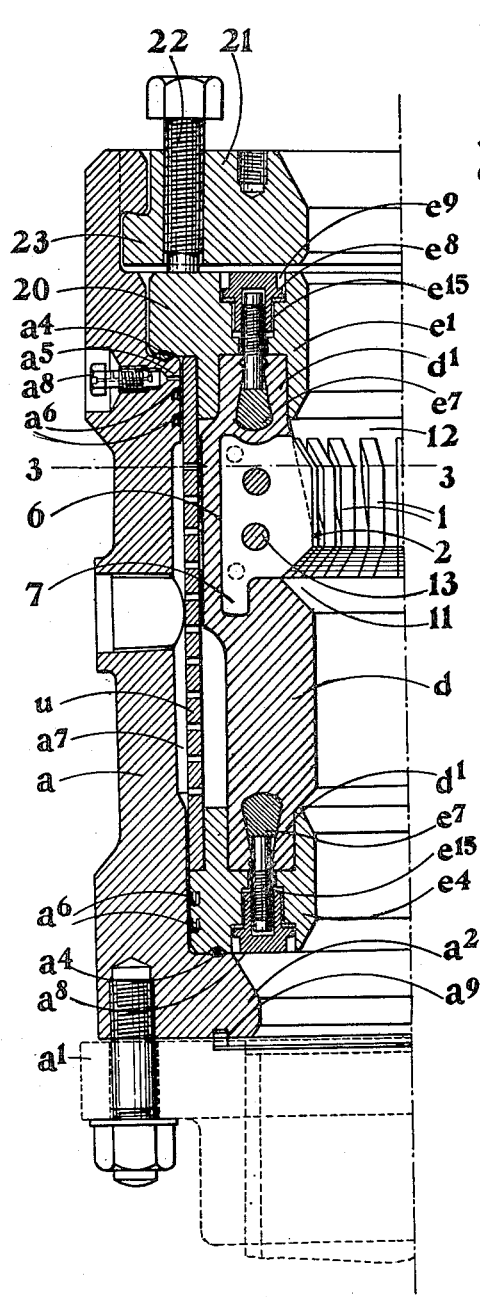
Figures 7, 8:
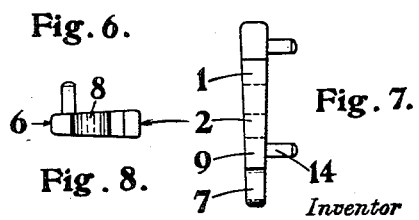
Figures 7 and 8 show in end elevation and plan respectively a modified form of radial plate or segment having the same shape in front elevation as illustrated in Figure 4.

In carrying the invention into effect according to one construction as illustrated in Figure 1 to 6 of the accompanying drawings in the provision of a massive elastic sleeve for a casing head equipment, the sleeve $d$ may be provided of a form substantially according to Figure 1 or Figure 7 of the drawings relating to the prior patent aforesaid, and a circular series of radial plates or segments 1 may be provided in the upper part of the sleeve $d$ and beneath that part of the sleeve engaged within the upper end ring $e^1$. The radial plates or segments 1 are advantageously of uniform dimensions and set apart equidistant, and of a number that may widely vary, being advantageously considerable in number with uniform interstitial spaces between; the number however is not so great and the interstitial spaces are not so narrow as to impair the flexibility of the inner part of the sleeve adjacent the internal circumferential face under compression due to the pressure externally applied to the sleeve. The radial plates or segments 1 are advantageously incorporated in the sleeve $d$ in moulding it whereby their inner faces 2 are exposed at the inner peripheral face of the sleeve and in such manner that the plates or segments are so integrally incorporated as to be inseparable from the sleeve under the conditions of use, but adapted under its elastic resistance to move radially whereby the inner periphery of the sleeve has flexibility by which intimate contact is possible with the external surface of the pipe (or other) sections and couplings, or of the Kelly or grief stem under the pressure imposed externally of the sleeve, whereby the pipe section and couplings or the Kelly or grief stem may be passed through or held within the sleeve under substantially fluid-tight conditions. By such means a considerable and elastic resistance is imposed to the internal contraction of the sleeve $d$ near its upper end, by reason of the compression of the substance of the sleeve at positions between the lateral faces of the radial plates or segments near their inner faces 2 at which they are exposed at the peripheral face of the sleeve $d$.

According to the illustrated construction the radial plates or segments 1 are adapted to be accommodated immediately beneath the upper end ring $e^1$, that is to say, in a construction such as that indicated in Figure 1 or Figure 7 of the drawings of the prior Patent No. 1,902,906, the respective fastening rings $e^7$ are advantageously provided of a substantially wedge-shaped cross-section, so that when the fastening rings are set within the annular cavities in the respective end rings $e^1$, $e^4$ they form with the side walls of the cavities two lateral spaces of a substantially dovetail section, whereby the inclined faces 3 of the fastening rings serve firmly to hold the ends $d^1$ of the sleeve in position against the adjacent inner and outer circumferential walls of the respective end rings. The fastening rings $e^7$ are advantageously provided at intervals with holes 5 of substantial size extending from one face 3 of the ring to the other, and they may as in the construction of the prior patent aforesaid be provided with axial or vertical slots at intervals within which a corresponding number of fastening pins $e^{15}$ set equidistant apart may be welded, the pins $e^{15}$ being passed through holes in coincident positions in the end rings $e^1$ and $e^4$, whereby the fastening rings $e^7$ may be secured in position by means of nuts $e^8$ inserted within holes $e^9$ provided in the end rings at the face opposite to that at which the annular cavities are provided. The sleeve may be moulded with the respective fastening rings $e^7$ embedded in its ends so that only the pins $e^{15}$ are exposed as a means for securing the sleeve $d$ to the end rings $e^1$, $e^4$. In this way the fastening rings $e^7$ may not extend outward beyond the edges of the annular cavities in the end rings $e^1$, $e^4$.

The series of radial plates or segments 1 in the construction illustrated in Figures 1 to 6 are disposed in circular series in position immediately beneath the upper end ring $e^1$, and they may be so set in the mould space in which the sleeve $d$ is moulded that their outer faces or edges 6 are disposed parallel with the outer face of the sleeve $d$, while at their lower ends each of the plates extends to form a small projecting part or tongue 7 and at their upper ends a recess 8 (Figures 4 and 6) may be provided in a middle position for the accommodation of the fastening ring $e^7$. At the inner face or edge 2 the radial plates or segments 1 are advantageously formed with an inclined lower face 9 (Figures 4 and 5) serving to define the upper face of an annular cavity 11 (Figure 1) on the inner peripheral face of the sleeve $d$, while the inner face or edge 2 of the radial plates or segments then rises to form a middle part parallel with the axis or centre line of the sleeve $d$, to extend proud of the outwardly flaring mouth 12 of the sleeve to a position at which the upper part of the inner face or edge recedes to form the inclined upper face 10 which extends to the top to terminate flush with the peripheral face of the sleeve at its mouth adjacent the edge of the inner peripheral wall of the end ring. Thus where the mouth of the sleeve is of conical form such as represented in Figure 1 of the drawings of the prior patent aforesaid, the upper part of each of the radial plates or sections forms an inwardly extending part of a substantially triangular form protruding within the conical mouth of the sleeve, as illustrated in Figure 1. The parts of the drill pipe sections or couplings or the Kelly or grief stem on insertion within the sleeve come into contact with the inclined upper face 10 of these inwardly extending parts of the radial plates or segments by which they are guided into the sleeve under conditions that facilitate their passage into and through it.

The respective radial plates or segments are advantageously provided with holes 13 that extend from one lateral face to the other, so that thus the India rubber or other elastic substance of which the sleeve d is moulded extends through the holes in the radial plates or segments, and the plates or segments are thus held in position in the sleeve, while the recess 8 at the upper end of the plates or segments and the downwardly extending tongue 7 at the lower part thereof also contribute to the complete incorporation and retention of the radial plates or segments within the sleeve under the conditions of use.

It will be understood that the annular cavity 11 formed on the inner peripheral face of the sleeve d beneath the lower exposed faces 9 of the radial plates or segments may be of a substantially V-shaped cross-section, and that the lower face of the annular cavity may extend at an angle, for example a right angle, to the face of the cavity disposed in alignment with the lower exposed faces 9 of the radial plates or segments.

Means may be provided by which the pressure imposed between the radial plates or segments near their inner faces or edges is increased as the sleeve contracts under the external pressure to which it is subjected. Such means may take a variety of forms. Thus for example on one face of the radial plates or segments near their outer edges or faces 6 protruding parts or pins 14 of a circular or other cross-section, or two or more such protruding parts or pins may be provided extending across the space between adjacent radial plates in the manner indicated in Figures 3, 4, 5 or 6, so as to contact with the opposed face of the next adjacent radial plate or segment as the sleeve d contracts under the external pressure applied to it. Or again the cross-sectional shape of the radial plates or segments 1 may be determined with the object of increasing the resistance to contraction of the sleeve in the compression of the substance of the sleeve in position between the respective plates near their inner edges. Thus the radial plates or segments may be provided approximately wedge-shape in transverse cross-section as illustrated in Figures 7 and 8, whereby the thickness of the plate or segment may increase towards the inner face or edge 2. Or again the radial plates or segments may be provided of a wedge-shape in vertical cross-section as illustrated in Figures 7 and 8, the vertical cross-section being reduced from the upper end to the lower end of the plates or segments, so that thus the resistance to contraction of the sleeve may be increased at the upper end on compression of the elastic substance of the sleeve in position between the respective plates or segments near the upper end under the pressure externally applied to the sleeve. Or again the transverse cross-section of the plates or segments may yield curved lateral faces or convex or concave lateral faces, or the cross-sectional shape may yield irregular lateral faces near the inner faces or edges of the radial plates or segments. Thus the lateral faces near the inner faces or edges 2 of the plates or segments may be stepped or corrugated longitudinally or transversely or formed with convex or concave longitudinal or transverse flutings, and the recessed or concave parts upon the faces of one radial plate or segment may be disposed opposite to correspondingly ridged or convex parts on opposite faces of the adjacent radial plate or segment, or the recessed concave parts of one plate or segment may be disposed opposite to the similar recessed or concave parts of the opposite face of the adjacent plate or segment. Or again in a simple form contribution to the effects aimed at may be secured by thickening of the radial plates or segments at or near the inner faces or edges of the plates or segments; or the plates or segments may be provided with irregular lateral surfaces with the purpose of ensuring a binding of the plates or segments with the elastic material of the sleeve, with or without a substantially wedge-shape or other cross-section in a horizontal or vertical plane that is adapted to increase the resistance to contraction of the sleeve at its upper part, it being understood that the distance apart of the lateral faces is however so determined as to provide an adequate thickness in the substance of the sleeve and to ensure the flexibility of the sleeve adjacent the inner peripheral surface and particularly near the upper part of the sleeve under the conditions imposed in use.

Figure 9:
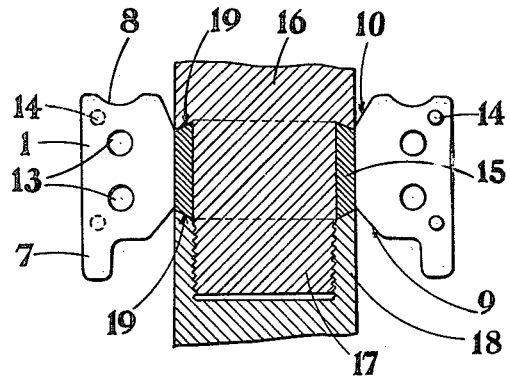
Figure 9 is a diagrammatic view partly in cross-section illustrating the manner in which the radial plates or segments are integrally cast together and held concentrically within the mould space in which the massive elastic sleeve is produced and vulcanized.

For the purpose of ensuring the substantial fixity of position of the radial plates or segments 1 in the moulded sleeve d, the radial plates or segments may as illustrated in Figure 9 be advantageously produced in the relative position in which they are to be set in the mould by casting them together upon an inner connecting ring 15 which may for example be provided of a dove-tail cross-sectional shape, and the plates or segments may be integrally secured to the ring at the middle position of their inner face or edge 2, so that thus the integral cast ring and plates may be mounted in position within the mould upon a divided mandrel 16, one part of which may be reduced at 17 and the reduced part screw-threaded, while the other part 18 may be formed hollow at its upper end and adapted for the reception of the screw-threaded part 17, so that thus when the two parts of the mandrel 16 are screwed together an annular gap is formed between them having inclined or under-cut annular faces 19 between which the connecting ring 15 of substantially dove-tail cross-section is engaged, so that thus the radial plates or segments are held in concentric and radial positions within the mould, and after moulding and separating the respective parts of the mandrel 16 the ring 15 may be machined away by which the radial plates or segments are left separated in their determined position within the sleeve with the middle part of their faces 2 flush with the inner peripheral face of the sleeve d.

Figure 10:
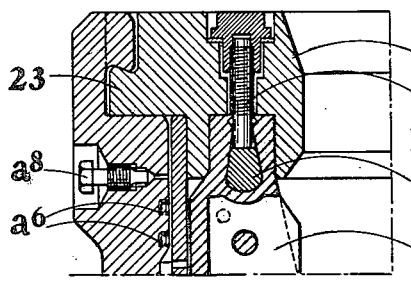
Figure 10 is a partial half sectional elevation of a construction similar to that illustrated in Figure 1 modified whereby the upper end ring in which the massive elastic sleeve is held serves as the locking ring.

In carrying the invention into effect in its application to a stationary casing head equipment or packer as illustrated in Figure 1, the stationary casing $a$ is provided to be set and secured in position with a tight joint on the well head flange $a^1$, and the stationary casing is provided at its lower part with an inwardly extending flange $a^2$ on the top face of which may rest the lower end ring $e^4$ of the massive elastic sleeve $d$. A tight joint may be conveniently made by the provision on the top face of the flange $a^2$ and on the under face of the lower end ring of an annular groove or grooves in coincident positions for the reception of a packing ring or rings $a^4$ of gutta percha, wire or other material, while similarly the upper end ring $e^1$ may be provided to extend outwardly at 20 to form a contact under face that is adapted to engage a shoulder $a^5$ at the upper end of the casing, and between these respective parts a fluid tight joint may be similarly made by the provision of a coincident annular groove or grooves in the oppositely disposed contact faces for the reception of a suitable packing ring such as $a^4$. The respective end rings $e^1$, $e^4$ adjacent the outer peripheral wall are provided for the accommodation of the perforated external cylinder $u$, the outer surface of which is flush with the outer peripheral face of the lower end ring $e^4$, so that thus on the ends of the massive elastic sleeve $d$ being secured in the end rings $e^1$, $e^4$ and the external perforated cylinder $u$ applied around the rings, and the end rings $e^1$, $e^4$ held against the respective edges of the external perforated cylinder $u$, the parts $e^1$, $e^4$ and $u$ and the sleeve held between the parts $e^1$, $e^4$ form a unit that may be readily introduced within the stationary casing $a$ and readily withdrawn, and pressure tight joints made in a simple and effective way. A locking ring 21 may be mounted in position above the upper end ring $e^1$ and means provided such as a series of studs 22 carried by the locking ring for applying pressure to the upper end ring $e^1$ and through the external perforated sleeve to the lower end ring $e^4$ in the manner hereinbefore described. The locking ring 21 is advantageously provided with a number of segmental projecting parts 23 at equi-distant intervals on its periphery which are permitted to pass into the upper end of the casing $a$ through corresponding segmental apertures, and on the locking ring 21 being partially rotated the segmental projecting parts 23 engage beneath overhanging parts or edges of the casing $a$, whereby the locking ring 21 is held in a position by which the unit $e^1$, $e^4$, $u$, $d$ may be retained or locked in position within the casing $a$. Or again the upper end ring $e^1$ may itself be provided as a locking ring as illustrated in Figure 10 by which the end ring $e^1$ may be adapted similarly to the locking ring 21 (Figure 1) whereby the end ring $e^1$ may thus be engaged in its locking position in its partial rotation, the outwardly projecting segmental parts 23 being for the purpose integrally provided upon the end ring $e^1$ and the form of the end ring and of the upper part of the casing $a$ being correspondingly modified thus to avoid the use of a separate ring 21.

According to a modification instead of providing packing $a^4$ between adjacent contact faces of the end rings $e^1$, $e^4$ and of the stationary casing $a$ two or more packing rings $a_6$ of a U-section may be employed which for the purpose may for example be set within annular grooves provided on the outer peripheral face of the lower end ring $e^4$ and at the upper end of the stationary casing $a$ adjacent the upper part of the external perforated cylinder $u$ respectively, the cavities of the packing rings $a^6$ being disposed towards the annular space surrounding the external perforated cylinder in which pressure is maintained, or where a jointing ring such as $a^4$ is not provided between the under face of the lower end ring $e^4$ and the top face of the inwardly extending flange $a^2$ of the casing $a$ one, two or more additional annular cavities may be provided for the reception of U-packing rings $a^6$ on the external peripheral face of the end ring $e^4$, the cavities in the U-rings being directed downwardly.

It will be understood that the internal diameter of the stationary casing may be increased at $a^7$ to form an annular space surrounding that part of the external perforated cylinder within which the transverse holes are provided and in which pressure is maintained.

A testing plug $a^8$ may be provided at the upper part of the stationary casing $a$ and a packing ring $a^9$ (Figure 1) may be provided for accommodation within coincident annular recesses provided in the well head flange $a^1$ and in the under face of the inwardly extending flange $a^2$ of the stationary casing $a$.

Figure 11:
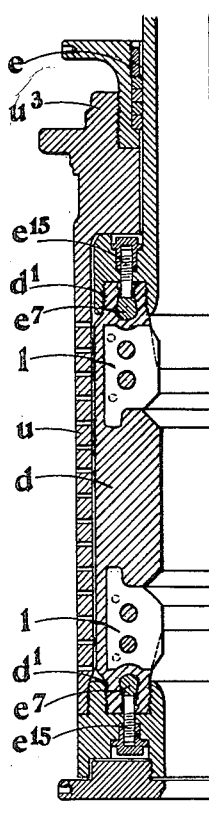
Figure 11 is a half sectional elevation of a rotor in which a massive elastic sleeve constructed and provided according to the invention may be mounted and used in a construction such as that illustrated in Figure 1 or 7 relating to the drawings of the prior patent aforesaid.

Furthermore the circular series of radial plates or segments $l$ instead of being set in the upper part only of the sleeve as illustrated in Figure 1 may be set both at the upper and lower parts of the sleeve $d$ so that the sleeve $d$ may thus be reversible in its position as illustrated in Figure 11 which represents a construction in other respects the same as the rotor in a rotary gyratory type of blow-out preventer such as illustrated in Figure 1 of the drawings of the prior patent aforesaid: the form of the radial plates or segments $l$ and the manner of connection of the sleeve at its respective ends being otherwise the same as that illustrated in Figure 1 except that the circular series of plates or segments $l$ are provided near both ends of the sleeve. It will be understood that the construction illustrated in Figure 11 is adapted to a rotary non-gyratory type of blow-out preventer such as illustrated in Figure 7 of the drawings relating to the prior patent aforesaid, and thus to any construction of blow-out preventer in which a massive elastic sleeve such as described in the specification filed pursuant to the said co-pending application is applicable.

Figure 12:
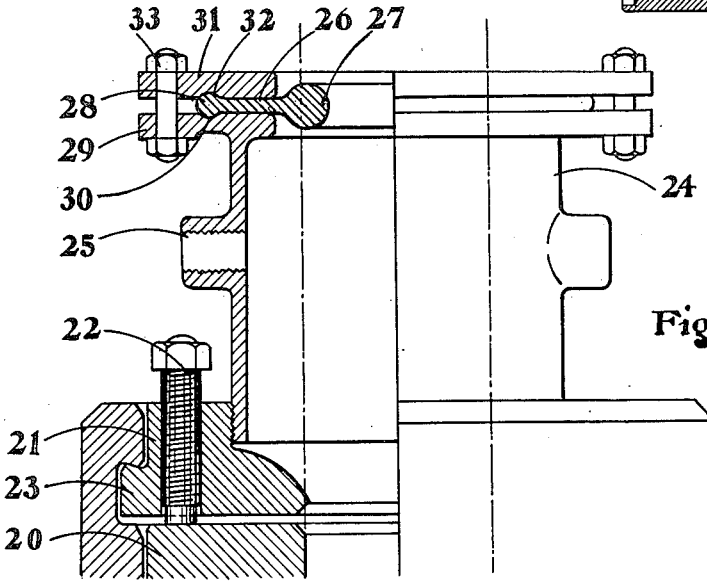
Figure 12 is a partial elevation partly in section showing a spray-catching equipment surmounting a blow-out preventer provided for the reception of a massive elastic sleeve equipped according to the invention.

In a central position the locking ring 21 or the equivalent may as illustrated in Figure 12 be provided for the reception within it of the lower end of a superposed concentric cylindrical casing 24 adapted to serve as a spray catcher and for the purpose of conveying away any oil or gas that may leak through the blow-out preventer or packer. The superposed casing 24 is for the purpose provided of a larger internal diameter than that of the sleeve $d$ and with bosses 25 provided integrally in the peripheral wall of the casing 24 to which outlet pipes may be connected, while in position above, the superposed casing 24 is provided with means for clamping a horizontally disposed flexible closing disc 26 of an annular form conveniently provided with enlarged rims 27, 28 at its inner and outer edges. This annular flexible disc 26 may be conveniently made of India rubber, and is advantageously held in position upon the top face of an outwardly extending flange 29 of the casing 24, within which an annular channel 30 is provided to accommodate the external rim 28 of the disc, a corresponding clamping ring 31 of annular form being set in position above the flange 29 and provided on its under face with a corresponding and coincident annular channel 32 in which the enlarged peripheral edge 28 of the annular flexible disc 26 is accommodated, the clamping ring 31 being suitably held in position by a series of bolts 33 passing through the clamping ring 31 and flange 29 at positions beyond the outer peripheral edge 28 of the annular disc, so that thus the disc 26 may extend inward to form a joint with the tubing concentrically extending within the superposed casing 24. The enlarged inner peripheral edge 27 of the elastic disc 26 is conveniently provided of a diameter slightly smaller than that of the tubing to be run through the casing head. By such means as the annular elastic disc 26 is disposed transversely over the upper end of the casing 24 any oil or gas leaking through the blow-out preventer or packer is received within the superposed casing 24 and conveyed away from the well head.

The ends $d^1$ of the massive elastic sleeve $d$ by which the sleeve is connected to the end rings or the outer parts of the ends $d^1$ of the sleeve $d$ may be produced of hard rubber, while the main part of the sleeve may be produced of soft rubber.

Figure 2:
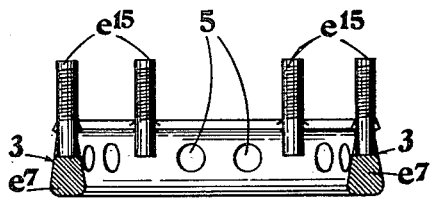
Figure 2 is a detail view partly in section of one of the fastening rings employed for the connection of the massive elastic sleeve to one of the respective end rings by which the sleeve is held within the stationary casing.
Figure 3:
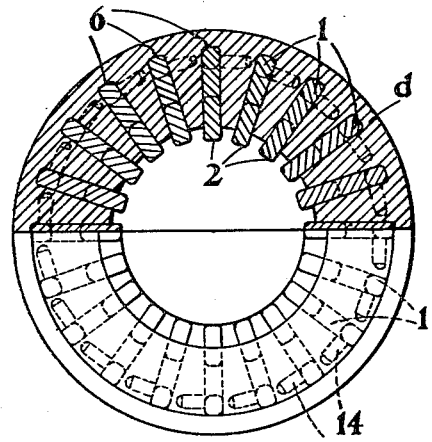
Figure 3 is a plan view partly in section on the line 3—3, Figure 1, showing the disposition of the radial plates or segments within the massive elastic sleeve.
Figures 4, 5:
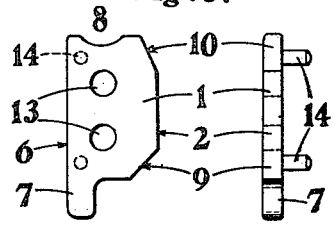
Figures 4, 5 and 6 are side elevation, end elevation and plan respectively of one of the radial plates or segments of the massive elastic sleeve.
Figure 6:

It will be understood that in the construction illustrated in Figure 1 the contraction of the massive elastic sleeve under the pressure externally applied to it takes place under the resistance imposed by the ends $d^1$ of the sleeve being held by the fastening rings within the end rings $e^1$, $e^4$ and by the stress imposed being taken upon the intermediate and perforated cylinder $u$ that maintains the end rings $e^1$, $e^4$ in definite relation. By such means the connection of the fastening rings with reinforcements within the massive elastic sleeve in the manner illustrated in Figure 1d of the specification of the co-pending application is avoided. Two circular series of radial plates or segments may be provided within a massive elastic sleeve set within a unit comprising the end rings $e^1$, $e^4$ and the intermediate and perforated cylinder $u$ and in which the massive elastic sleeve is held secured within the end rings by fastening rings against the pressure externally applied to the sleeve as in the construction illustrated in Figure 1 of the accompanying drawings. It will however be understood that as illustrated in Figure 11 one or two circular series of radial plates or segments may be incorporated within a massive elastic sleeve which is held within the end rings, one of which end rings is adapted to have an axial movement relatively to the other in the manner described in the specification filed pursuant to the said co-pending application, such a construction being adapted to a packer such as illustrated in Figure 2 of the drawings of the said co-pending application, or to a rotary gyratory type of construction such as illustrated in Figure 1, or a rotary non-gyratory type of construction such as illustrated in Figure 3 of the drawings relating to the said co-pending application.

It will be understood that the form of the radial plates or segments may be varied widely to secure the effects aimed at and that no limitation is involved to the forms hereinbefore specifically described. Thus the inner faces of the segments may be provided flush with the internal peripheral surface of the sleeve $d$, or instead the internal faces or edges of the radial plates or segments at the upper parts may extend slightly beyond the internal peripheral face of the sleeve at its mouth without being formed in the angular shape hereinbefore specifically described. Or again the inner faces or edges may protrude slightly where they are exposed within the sleeve. No limitation is thus involved to the formation of the inner face or edge of the radial plates or segments in three parts at an angle to each other in the manner described, and the inner face or edge may be provided of any other form so long as at the respective ends there is no liability of engagement of the plates with the couplings or other parts of the tubing or the like in a manner that might cause the separation of the radial plates or segments from the sleeve, and so long as the plates or segments are adapted to impose a resistance to excessive deformation of the upper end of the sleeve and are effectively incorporated with the sleeve in the manner hereinbefore described.

Furthermore the radial plates or segments may be formed relatively narrow or relatively wide, and thus they may be of a relatively small number or of a relatively considerable number, but they are advantageously so provided and mounted within the sleeve as not to be separable from the sleeve under the conditions of use, and the parts of the radial plates or segments that are embedded in the rubber advantageously have their edges rounded, and while the radial plates or segments may be formed advantageously of wear-resisting steel they may be provided of any other material adapted to resist wear.

Furthermore no limitation is involved to the length of the radial plates or segments employed. Thus for example the radial plates or segments might be provided of a length considerably more in relation to the length of the sleeve than that indicated in Figure 1, and thus the plates may be provided to extend from a position immediately beneath the upper end ring to a position immediately above the lower end ring and advantageously with a gap in a middle position corresponding to the internal annular recess 11 provided in the sleeve.

I claim:—

1. In a casing head equipment for wells, a massive elastic sleeve adapted to contract inwardly under pressure externally applied to it, and means supported wholly by and within the sleeve to impose an increasing resistance to the inward contraction, comprising a circular series of separate radial plates or segments incorporated within the substance of the sleeve, the inner faces of the radial plates or segments being exposed at the internal peripheral surface of the sleeve.

2. In a casing head equipment for wells, a massive elastic sleeve adapted to contract inwardly under pressure externally applied to it, mechanical means separate from the sleeve and extending beyond the ends thereof by which the ends of the sleeve are positively held substantially immovable axially, and means supported wholly by and within the sleeve to impose an increasing resistance to the inward contraction of the sleeve comprising separate radial plates or segments, the inner faces of which are exposed at the internal peripheral surface of the sleeve.

3. In a casing head equipment for wells, a massive elastic sleeve adapted to contract inwardly under pressure externally applied to it and means supported wholly by and within the sleeve to impose an increasing resistance to the inward contraction, comprising a circular series of radial plates or segments incorporated within the substance of the sleeve, the inner faces of which plates normally projecting from the normal internal periphery of the sleeve.

4. In a casing head equipment for wells, a massive elastic sleeve adapted to contract inwardly under pressure externally applied to it and means supported wholly by and within the upper end of the sleeve to impose at the mouth of the sleeve an increasing resistance to the inward contraction comprising a circular series of radial plates or segments spaced apart, the said radial plates or segments being of such form and disposition that on the contraction of the sleeve the elastic substance of the sleeve in the interstitial spaces is compressed at the upper end thereof.

5. A casing head equipment for wells, comprising a massive elastic sleeve, a casing within which the sleeve is mounted, end rings within which the ends of the sleeve are secured and held against axial displacement, mechanical means separate from the sleeve and extending beyond the ends thereof by which the ends of the sleeve are secured therein, a cylinder disposed between the end rings and surrounding the sleeve and means supported wholly by and within the upper end of the sleeve to impose an increasing resistance to its inward contraction on the application of pressure externally applied, comprising a circular series of radial plates or segments incorporated within the substance of the sleeve, the inner faces of the radial plates or segments being exposed at the internal peripheral surface of the sleeve.

6. A casing head equipment for wells, comprising a massive elastic sleeve, a casing within which the sleeve is mounted, end rings within which the ends of the sleeve are secured and held against axial displacement, mechanical means separate from the sleeve and extending beyond the ends thereof by which the ends of the sleeve are secured within the end rings, a cylinder disposed between the end rings and surrounding the sleeve, and means supported wholly by and within the sleeve at the upper and lower ends of the sleeve to impose an increasing resistance to its inward contraction on the application of pressure externally applied, comprising circular series of radial plates or segments incorporated within the substance of the sleeve at its respective ends, the inner faces of the radial plates or segments being exposed at the internal peripheral surface of the sleeve.

7. In a casing head equipment for wells, a massive elastic sleeve adapted to contract inwardly under pressure externally applied to it, means within the sleeve to impose an increasing resistance to its inward contraction by pressure externally applied to it, comprising a circular series of radial plates or segments incorporated within the sleeve in the moulding of the sleeve and maintained within the sleeve in the moulding operation by the integral formation of the radial plates or segments with a ring.

8. A casing head equipment for wells, comprising a massive elastic sleeve adapted for inward contraction under pressure externally applied, and means supported wholly by and within the sleeve to impose an increased resistance to its inward contraction, comprising a circular series of separate radial plates or segments incorporated within the substance of the sleeve and spaced equi-distant apart, the radial plates or segments being adapted in their cross-section to cause compression of the elastic substance of the sleeve in the interstitial spaces on the contraction of the sleeve.

9. A casing head equipment for wells, comprising a massive elastic sleeve adapted for inward contraction under pressure externally applied, and means supported wholly by and within the sleeve to impose an increasing resistance to its inward contraction, comprising a circular series of separate radial plates or segments incorporated within the substance of the sleeve and spaced equi-distant apart, the radial plates or segments having a wedge-shape in vertical cross-section.

10. A casing head equipment for wells, comprising a massive elastic sleeve adapted for inward contraction under pressure externally applied, and means supported wholly by and within the sleeve to impose an increasing resistance to its inward contraction, comprising a circular series of separate radial plates or segments incorporated within the substance of the sleeve and spaced equi-distant apart, the radial plates or segments having their lateral faces of irregular form.

11. A casing head equipment for wells, comprising a massive elastic sleeve adapted for inward contraction under pressure externally applied, and means supported wholly by and within the sleeve to impose an increasing resistance to its inward contraction, comprising a circular series of separate radial plates or segments incorporated within the substance of the sleeve and spaced equi-distant apart, the radial plates or segments being incorporated in the sleeve by means of holes through which the elastic substance of the sleeve extends from one lateral face to the other of the radial plates or segments.

12. A casing head equipment for wells comprising a massive elastic sleeve adapted for inward contraction under pressure externally applied, and means supported wholly by and within the sleeve to impose increasing resistance to its inward contraction, comprising a circular series of radial plates or segments incorporated within the substance of the sleeve and spaced equi-distant apart, the radial plates or segments having outwardly protruding parts near their outer ends to limit the extent of movement of the radial plates or segments towards each other.

13. A casing head equipment for wells, comprising a massive elastic sleeve adapted for inward contraction under pressure externally applied and having a conical mouth at its upper end, and means supported wholly by and within the sleeve to impose an increasing resistance to its inward contraction, comprising a circular series of radial plates or segments incorporated within the substance of the sleeve and spaced equi-distant apart, the inner faces of the radial plates or segments normally projecting from the normal internal periphery of the sleeve at its conical mouth.

14. A casing head equipment for wells comprising a massive elastic sleeve adapted for inward contraction under pressure externally applied, and means supported wholly by and within the sleeve to impose an increasing resistance to its inward contraction, comprising a circular series of separate radial plates or segments incorporated within the substance of the sleeve and spaced equi-distant apart, the radial plates or segments having their inner faces outwardly inclined at their upper and lower ends.

15. A casing head equipment for wells comprising a massive elastic sleeve adapted for inward contraction under pressure externally applied, and means supported wholly by and within the sleeve to impose an increasing resistance to its inward contraction, comprising a circular series of separate radial plates or segments incorporated within the substance of the sleeve and spaced equi-distant apart, the radial plates or segments having their inner faces outwardly inclined at their upper and lower ends, and the sleeve having an annular cavity at its inner periphery of an angular cross-section, the upper face of the annular cavity in the sleeve being in alignment with the inclined lower parts of the inner faces of the radial plates or segments.

16. A casing head equipment for wells comprising a massive elastic sleeve adapted for inward contraction under pressure externally applied, and means supported wholly by and within the sleeve to impose an increasing resistance to its inward contraction, comprising a circular series of separate radial plates or segments incorporated within the substance of the sleeve and spaced equi-distant apart, the radial plates or segments having their rear faces parallel with the external periphery of the sleeve and being of an irregular shape at their upper and lower ends.

LEWIS MERVYN CECIL SEAMARK.